(12) United States Patent
Kovacs et al.

(10) Patent No.: US 10,807,752 B2
(45) Date of Patent: Oct. 20, 2020

(54) PACKAGING MACHINE WITH TILTING TOOL DRAWER

(71) Applicant: MULTIVAC SEPP HAGGENMÜLLER SE & CO. KG, Wolfertschwenden (DE)

(72) Inventors: Peter Kovacs, Memmingen (DE); Klaus Weiß, Bad Grönenbach (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 239 days.

(21) Appl. No.: 15/943,560

(22) Filed: Apr. 2, 2018

(65) Prior Publication Data

US 2018/0282009 A1    Oct. 4, 2018

(30) Foreign Application Priority Data

Apr. 4, 2017    (DE) .......................... 10 2017 107 243

(51) Int. Cl.
| | | |
|---|---|---|
| *B65B 59/04* | (2006.01) | |
| *B65B 65/02* | (2006.01) | |
| *B29C 65/00* | (2006.01) | |
| *B65B 9/04* | (2006.01) | |

(52) U.S. Cl.
CPC ........ *B65B 59/04* (2013.01); *B29C 66/86533* (2013.01); *B29C 66/876* (2013.01); *B65B 9/04* (2013.01); *B65B 65/02* (2013.01); *B29C 66/8167* (2013.01)

(58) Field of Classification Search
CPC ............. B29C 66/8167; B29C 66/876; B29C 66/86533; B65B 59/04

USPC .......................... 53/453, 329.3, 559; 483/28
See application file for complete search history.

(56) References Cited

U.S. PATENT DOCUMENTS

| 3,474,494 | A | * | 10/1969 | Damm | .................. | B29C 33/305 |
| | | | | | | 425/116 |
| 5,940,953 | A | * | 8/1999 | Arends | .................. | B23Q 3/155 |
| | | | | | | 280/35 |
| 7,340,871 | B1 | | 3/2008 | Shackelford et al. | | |
| 7,607,279 | B2 | * | 10/2009 | Shackelford | ............ | B65B 59/04 |
| | | | | | | 493/143 |

(Continued)

FOREIGN PATENT DOCUMENTS

| CN | 104169064 A | 11/2014 |
| DE | 10359478 A1 | 7/2005 |

(Continued)

*Primary Examiner* — Robert F Long
*Assistant Examiner* — Xavier A Madison
(74) *Attorney, Agent, or Firm* — Husch Blackwell LLP

(57) ABSTRACT

A packaging machine comprising a machine frame and at least one workstation with a lifting gear for supporting and moving a lower tool part between an open and a closed position. The workstation may include an upper tool part to act in cooperation with the lower tool part during a working operation. The lower tool part may be engaged with or near in proximity to an upper tool part in the closed position, and will be spaced apart from the upper tool part in the open position. A tilting mechanism is provided for a tool changing operation to tilt the lower tool part into a tilted position when the lower tool part is in the open position. In one embodiment, the lower tool part is removed from the packaging machine on a rail system in the direction corresponding to the tilted position.

14 Claims, 3 Drawing Sheets

(56) References Cited

U.S. PATENT DOCUMENTS

| | | | | |
|---|---|---|---|---|
| 7,703,265 | B2* | 4/2010 | Bonneville | B65B 41/14 53/453 |
| 8,028,504 | B2* | 10/2011 | Zeller | B65B 59/04 53/559 |
| 9,555,513 | B2* | 1/2017 | Schmeiser | B65B 7/164 |
| 9,567,124 | B2* | 2/2017 | Ehrmann | B65B 9/04 |
| 2012/0291400 | A1 | 11/2012 | Ehrmann | |
| 2015/0052848 | A1* | 2/2015 | Vine | B62B 3/08 53/329 |
| 2017/0313457 | A1* | 11/2017 | Bonneville | B65B 47/04 |

FOREIGN PATENT DOCUMENTS

| | | |
|---|---|---|
| EP | 467069 A1 | 1/1992 |
| EP | 895933 A1 | 2/1999 |
| EP | 2384980 A1 | 11/2011 |
| EP | 2522580 A1 | 11/2012 |
| EP | 2769923 A1 | 8/2014 |
| EP | 2982487 A2 | 2/2016 |
| WO | 2013140187 A1 | 9/2013 |

\* cited by examiner ained sideways like a drawer underneath and through the machine frame. U.S. Pat. No. 7,340,871 B1 requires, however, that the lower tool part that can be pulled out is supported by a lifting gear with a long stroke length so that the lower tool part may be sufficiently deeply lowered down to a very low level within the machine frame. Only in this case may the lower tool part be pulled out from its deep position sideways in the horizontal orientation towards the operator's side without colliding with a chain guide, a side frame profile or other attachments laterally mounted to the machine frame. A lifting gear that opens to such an extent, however, is not available at every packaging machine and may not be desired at some packaging machines, in particular because the performance may be reduced due to an unnecessary additional stroke.

PACKAGING MACHINE WITH TILTING TOOL DRAWER

CROSS-REFERENCE TO RELATED APPLICATIONS

This Application claims priority to German Patent Application No. 102017107243.8, filed on Apr. 4, 2017, to Peter Kovacs and Klaus Weiβ, currently pending, the entire disclosure of which is incorporated herein by reference.

BACKGROUND OF THE INVENTION

U.S. Pat. No. 7,340,871 B1 discloses a generic packaging machine wherein, for a tool changing operation, a lower tool part may be pulled out of the machine frame of the packaging machine from a horizontal orientation sideways further in the horizontal orientation on a rail system. To this end, the rail system is fixed laterally to the machine frame such that the lower tool part thereon may be pulled out sideways like a drawer underneath and through the machine frame. U.S. Pat. No. 7,340,871 B1 requires, however, that the lower tool part that can be pulled out is supported by a lifting gear with a long stroke length so that the lower tool part may be sufficiently deeply lowered down to a very low level within the machine frame. Only in this case may the lower tool part be pulled out from its deep position sideways in the horizontal orientation towards the operator's side without colliding with a chain guide, a side frame profile or other attachments laterally mounted to the machine frame. A lifting gear that opens to such an extent, however, is not available at every packaging machine and may not be desired at some packaging machines, in particular because the performance may be reduced due to an unnecessary additional stroke.

Starting from this situation, the object underlying the invention is to improve a packaging machine with respect to a tool changing operation, and in particular to provide a technical solution for this which may be inexpensively realized at different packaging machine types.

SUMMARY OF THE INVENTION

The present invention may comprise a packaging machine for manufacturing products along a production direction, wherein one embodiment of the packaging machine may be a deep-drawing packaging machine. The packaging machine according to the invention comprises a machine frame and at least one workstation, in particular a sealing station and/or a shaping station, with a lifting gear for supporting and moving a lower tool part between an open and a closed position, wherein the lower tool part may be approached, in the closed position for a working operation, to an upper tool part arranged thereabove, and may be, in the open position, spaced apart from the upper tool part.

According to the invention, a tilting mechanism may be provided for a tool changing operation which may be configured to bring the lower tool part from its typically horizontal orientation taken in the open position to a tilted position. In the tilted position, the lower tool part may be arranged to be inclined with respect to a horizontal reference plane. Here, the tilting mechanism may orient the lower tool part for the tool changing operation such that it may be de-installed from the packaging machine without colliding with laterally fixed frame parts. In particular, a lifting gear with a reduced stroke length compared to prior art can be used for this, whereby the performance of the lifting gear and thus also the overall performance of the packaging machine are more effective.

Thus, the invention abandons the conventional aim of removing the lower tool part exclusively in a horizontal orientation for a tool change of the packaging machine.

Preferably, the tilted position of the lower tool part defines a direction for the tool changing operation, and a stroke path of the lifting gear defines a direction for lifting and lowering the lower tool part, wherein the respective directions, as viewed in a vertical plane of projection, with respect to which the production direction may be oriented orthogonally, together include an acute angle. Thereby, the lower tool part may be tilted towards the bottom and be pulled out of the packaging machine sideways along the direction of the tilted position.

Preferably, the tilting mechanism may be integrally embodied at the lifting gear of the workstation. Thereby, a particularly robust and compact construction results which may be in particular designed for permanent operation. Such a lifting gear with a tilting mechanism integrally installed thereto may be employed at different packaging machine types.

Preferably, the tilting mechanism may be designed to bring the lower tool part to a tilted position within the machine frame. Thereby, a flux of force may be perfectly accommodated by the machine frame of the packaging machine, in particular during the tilting operation. Preferably, the lower tool part may be located underneath the upper tool part in its tilted position, as viewed in a vertical plane of projection. For this variant, only little space may be required altogether so that a compact construction may be possible.

According to a variant of the embodiment, in the tilted position, a side of the lower tool part facing a side frame of the machine frame may be located at a lower level than an opposite side of the lower tool part facing away from the side frame. Thereby, the lower tool part may be lowered to the side facing the operator so that it takes an orientation from which it may be pulled out of the packaging machine while being slightly inclined. In the process, the output force onto the lower tool part generated by the tilted position may even be beneficial for the tool changing operation.

Preferably, the tilting mechanism may be adjusted between a first and a second position, wherein in the first position of the tilting mechanism, the lower tool part may be horizontally oriented for a production operation, and wherein in the second position of the tilting mechanism, the lower tool part may be held in the tilted position for the tool changing operation from the horizontal orientation inclined about a tilting angle towards a side of the machine frame. The tilting mechanism may be thus designed, from a functional point of view, both for the production operation and for the tool changing operation.

In particular, the tilting mechanism includes a tilting unit with a lifting rail which may be pivoted about a tilting axis extending along the production direction. The lifting rail may be available for a production operation under the influence of strong forces, and for a stable tool changing operation, and it may moreover be easily integrated into different packaging machine types, in particular different deep-drawing packaging machines.

In an advantageous variant, the tilting mechanism comprises a pivot unit with a lifting rail configured as a pivot bearing, wherein the pivot bearing defines a pivot axis extending along the production direction about which the lower tool part may be pivoted to a tilted position. The pivot unit may be preferably arranged opposite the tilting unit within the machine frame. Both the pivot unit and the tilting unit are designed for a production operation under the influence of strong forces.

Preferably, the tilting mechanism has a base plate embodied for releasably mounting the lower tool part, the base plate being pivoted using the tilting mechanism. The base plate offers a stable support for the lower tool part and in particular also imparts high stability to the tilting mechanism. The base plate forms an inclined plane with a slope in the tilted position of the lower tool part along which the lower tool part may be transported out towards the operator's side of the packaging machine.

It may be furthermore advantageous for the packaging machine, in particular the tilting mechanism, to comprise at least one sensor for detecting a stop position the lower tool part has taken at the tilting mechanism. Thereby, using a security request, it may be determined whether the lower tool part may be appropriately arranged at the tilting mechanism for the production operation. If this is negated, an operation of the packaging machine will not be possible.

In a variant of the invention, the tilting mechanism comprises at least one sensor for detecting a locked position taken by the tilting mechanism in which the lower tool part may be oriented horizontally. Thereby, using a security request, it may be determined whether the lower tool part may be correctly arranged for the production operation. By this security request, it may also be ensured that the tilting mechanism may be arranged stably enough for the production operation to take up high forces during the production operation.

For a flexible use, in particular for using different lower tool parts, the tilting mechanism may be height adjustable. It would be conceivable that the tilting mechanism may be jacked up using selectively installed supports, whereby it may altogether take a higher level during the operation of the packaging machine.

Preferably, the machine frame comprises a seat for removably mounting a rail device for the tool changing operation to pull out the lower tool part from the machine frame thereon. On the rail device, the lower tool part may be brought into a position laterally of the packaging machine from which further handling may be performed particularly ergonomically.

Preferably, the rail device flushes with the inclined orientation of the tilting mechanism taken in the tilted position. Thus, the rail device may form, together with the tilting mechanism, a sufficiently long inclined plane on which the lower tool part may be pushed out of the packaging machine or into it.

For a tool changing operation that may be performed particularly easily and quickly, the tilting mechanism may preferably be operated from an operator's side of the packaging machine. Preferred may be a manual operability of the tilting mechanism.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show.

DETAILED DESCRIPTION OF THE INVENTION

Figure 1:
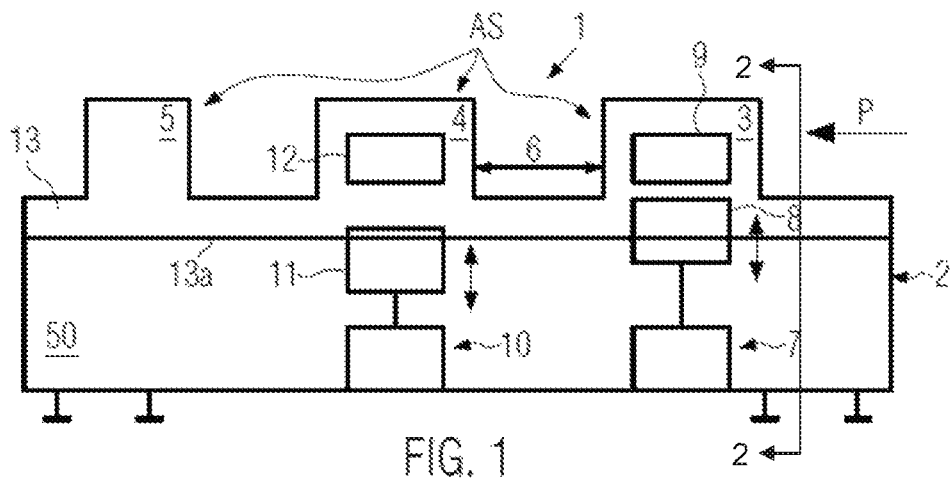
FIG. 1 a schematic side view of a packaging machine embodied as a deep-drawing packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows, in a schematic side view, a packaging machine 1 for manufacturing products along a production direction P. The packaging machine 1 has a machine frame 2 and a plurality of workstations AS. As viewed in the production direction P, the workstations AS are formed by a shaping station 3, a sealing station 4, and a cutting station 5. The shaping station 3 shapes troughs into a subfoil not shown in greater detail. Along an insertion section 6, the troughs of the subfoil are filled with products. At the sealing station 4, a lid foil not shown in greater detail is sealed to the subfoil after the interior of the trough has been evacuated and/or treated with gas to increase the durability, for example of food. The packages formed of the foil combination of subfoil and lid foil are singulated at the cutting station 5 and mechanically transported out of the packaging machine 1.

For the shaping operation at the shaping station 3, the packaging machine 1 comprises a lifting gear 7 for supporting and moving a lower tool part 8 relative to an upper tool part 9 arranged thereabove. The sealing station 4 downstream of the shaping station 3 as viewed in the production direction P comprises a lifting gear 10 for supporting and moving a lower tool part 11 relative to an upper tool part 12 arranged thereabove. In the shaping station 3, the lower tool part 8 is embodied as a lower mold part, and the upper tool part 9 is embodied as an upper mold part for manufacturing the troughs. In the sealing station 4, the lower tool part 11 is embodied as a lower sealing tool part, and the upper tool part 12 is embodied as an upper sealing tool part for the sealing operation.

Furthermore, FIG. 1 shows a lower side frame edge 13*a*. According to FIG. 1, the lower side frame edge 13*a* extends along the complete packaging machine 1 and is, for example, defined by a frame profile 13 of the packaging machine 1. The frame profile 13 is fixed to a side frame 50 of the packaging machine. For a tool changing operation, the respective lower tool parts 8, 11 may be pulled out of the packaging machine underneath the side frame edge 13*a*. The inventive principle for this will be described below with reference to the shaping station 3 of the packaging machine 1.

Figures 2, 3:
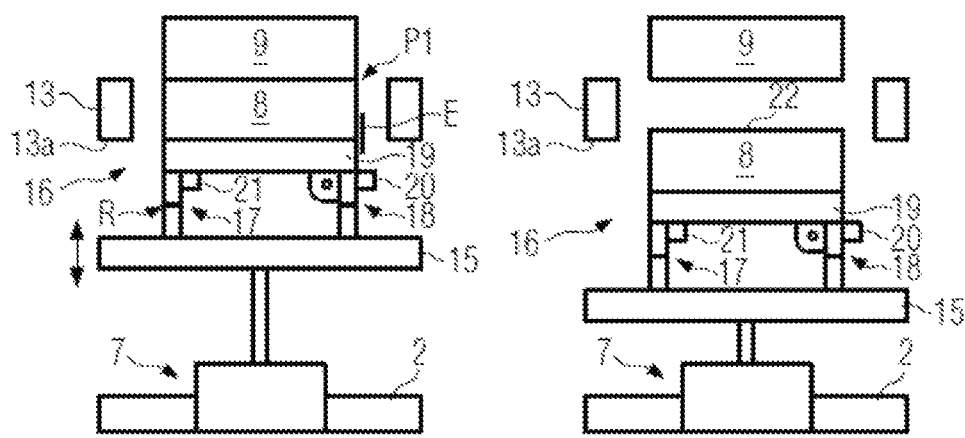
FIG. 2 is a schematic section view of one embodiment of the lifting gear apparatus of FIG. 1 cut along the line 2-2 showing a lower tool part arranged thereon in a closed working position.
FIG. 3 is a schematic section view of the embodiment of the lifting gear apparatus of FIG. 2 showing the lower tool part in an open working position.

FIG. 2 shows the lifting gear 7 of the shaping station 3 in an extended position in which the lower tool part 8 is brought to a closed position P1. In the closed position P1, the lower tool part 8 is approached to the upper tool part 9 arranged thereon for a shaping operation. According to FIG. 2, the lower tool part 8 is positioned, in its closed position P1, at a level comparable to the frame profile 13.

According to FIG. 2, the lifting gear 7 comprises a base 15 supported in a height adjustable manner and which may be embodied, for example, as a frame or plate. According to FIG. 2, on the lifting gear 7, in particular on the corresponding base 15, a tilting mechanism 16 is arranged. The tilting mechanism 16 is moved up and down using the lifting gear 7 during the production operation. Essentially, the tilting mechanism 16 comprises a tilting unit 17, a pivot unit 18, and a base plate 19 coupled thereon in a pivoting manner. The lower tool part 8 is releasably arranged on the base plate 19.

Furthermore, FIG. 2 shows that a sensor 20 is provided at the tilting mechanism 16 which is embodied to detect a stop position E taken by the lower tool part 8 at the tilting mechanism 16. Moreover, FIG. 2 shows that a further sensor 21 is arranged at the tilting mechanism 16 which is embodied for detecting a locked position R taken by the tilting mechanism 16 in which the lower tool part 8 is oriented horizontally.

FIG. 3 shows the lifting gear 7 of the shaping station 3 in a retracted position in which the lower tool part 8 takes an open position P2. In the open position P2, the lower tool part 8 is supported to be spaced apart from the upper tool part 9 arranged thereon. According to FIG. 3, the lower tool part 8 is still arranged horizontally above the lifting gear 7, as in FIG. 2, however at a lower level. While in FIG. 3, the lower tool part 8 is arranged at a lower level than in FIG. 2, the lower tool part 8 cannot be pulled out of the machine frame 2 horizontally sideways over the base plate 19 because it would collide with the frame profile 13 of the packaging machine 1 in the process. The lower tool part 8 could only be pulled out sideways underneath the frame profile 13 in its horizontal orientation if an upper edge 22 of the lower tool part defined by the lower tool part 8 would be positioned at a lower level than the lower side frame edge 13*a*. However, this is not the case according to FIG. 3. Consequently, the lifting gear 7 would have to be opened further from the position shown in FIG. 3 where the lower tool part 8 is arranged in the open position P2, i.e. the base 15 would have to travel further downwards beyond the position shown in FIG. 3. This, however, would require a particularly long stroke length of the lifting gear 7.

Figures 4, 5:
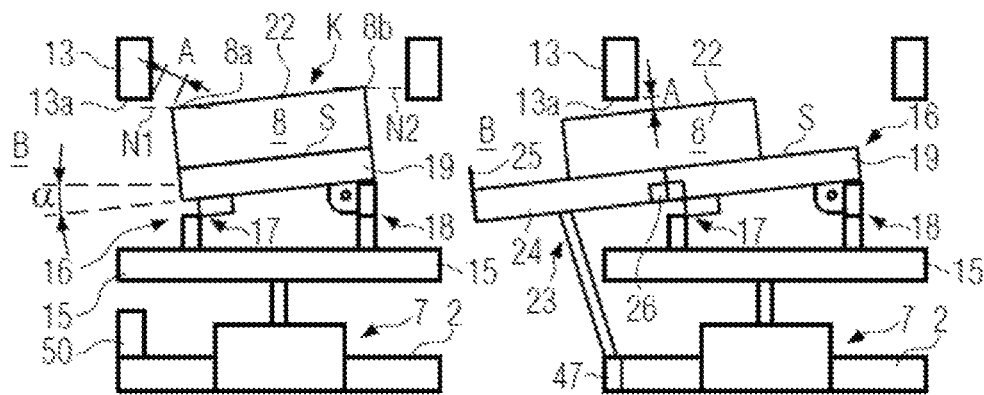
FIG. 4 is a schematic section view of one embodiment of the lifting gear apparatus of FIG. 1 cut along the line 2-2 showing the lower tool part in a tilted position for a tool changing operation.
FIG. 5 is a schematic section view of the lifting gear apparatus of FIG. 4 showing the lower tool part laterally pulled out from the tilted position on a rail device.

FIG. 4 shows a solution how the problems illustrated above could be cleverly overcome using the tilting mechanism 16.

According to FIG. 4, the tilting mechanism 16 has placed the lower tool part 8 in a tilted position K. In the tilted position K, the lower tool part 8 is oriented from its horizontal orientation taken in the open position P2 according to FIG. 3 inclined towards the side frame 50 of the machine frame 2. Here, a side 8*a* of the lower tool part 8 facing the side frame 50 of the machine frame 2 takes a level N1 which is lower than a level N2 of an opposite side 8*b* of the lower tool part 8 facing away from the side frame 50.

According to FIG. 4, the base plate 19 including the lower tool part 8 arranged thereon is arranged inclined downwards about a tilting angle α relative to the horizontal sideways towards an operator's side B. The base plate 19 here forms an inclined plane S whose slope is inclined downwards towards the operator's side B. Along the inclined plane S, the lower tool part 8 may be easily pulled out of the machine frame 2 of the packaging machine 1 laterally towards the operator's side B. Here, no collision of the lower tool part 8 with the frame profile 22 occurs because the upper edge 22 of the lower tool part may be pulled past and underneath the side frame edge 13 with a sufficiently large distance A. This is also shown in FIG. 5.

According to FIG. 5, the lower tool part 8 is pulled from the base plate 19 of the tilting mechanism 16 down onto a rail device 23. The rail device 23 is removably fixed to the machine frame 2 of the packaging machine 1 in a seat 47 in a direction that extends laterally from the machine frame. The rail device 23 comprises at least one rail 24 on which the lower tool part 8 can be pulled out to a stop 25. There, the lower tool part 8 may be serviced and/or cleaned, or is available for a tool change. According to FIG. 5, the rail 24 of the rail device 23 forms an elongation of the base plate 19, in particular an elongation of the inclined plane S formed by the base plate 19, on which the lower tool part 8 may be pulled out of the machine frame 2 and pushed into the position shown in FIG. 4.

FIG. 5 shows a coupling member 26 which is designed to fix the rail 24 to the base plate 19 of the tilting mechanism 16 for the tool changing operation and to orient them both along the inclined plane S.

Figure 6A:
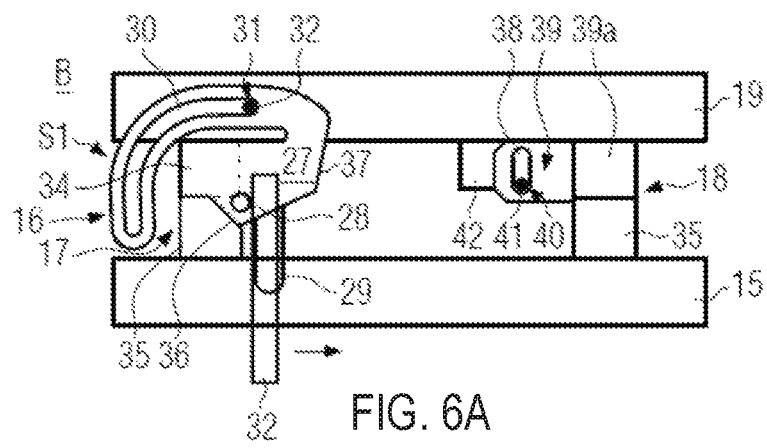
FIG. 6A is a schematic view of one embodiment of a lifting gear apparatus in accordance with the teachings of the present disclosure showing the tilting mechanism in a locked position for horizontally orienting the lower tool part.

FIG. 6A shows the tilting mechanism 16 in an enlarged representation. The tilting unit 17 of the tilting mechanism 16 comprises a tilting part 27 which is pivoted about a tilting axis 28 that is oriented in the production direction P and extends, according to FIG. 6A, into the image plane. The tilting unit 17 comprises a fastening projection 29 fastened to the base 15 of the lifting gear 7. Furthermore, an arcuate guide 30 is embodied at the tilting part 27. The arcuate guide 30 receives a projection 31 protruding from the base plate 19. The projection 31 may be embodied, for example, as a cylindrical stud 32 which is sliding along the guide 30. Furthermore, a grip 32 is fixed to the tilting part 27 and permits a manual actuation of the tilting mechanism 16.

Figure 6C:
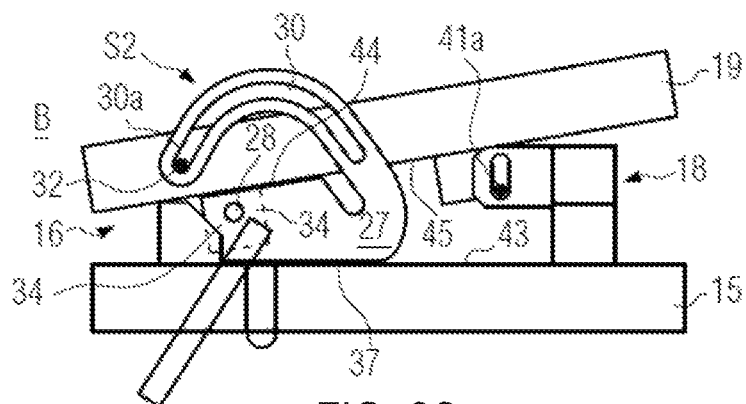
FIG. 6C is a schematic view of the lifting gear apparatus of FIG. 6A showing the tilting mechanism in a position for performing the tool changing operation.
Figure 7:
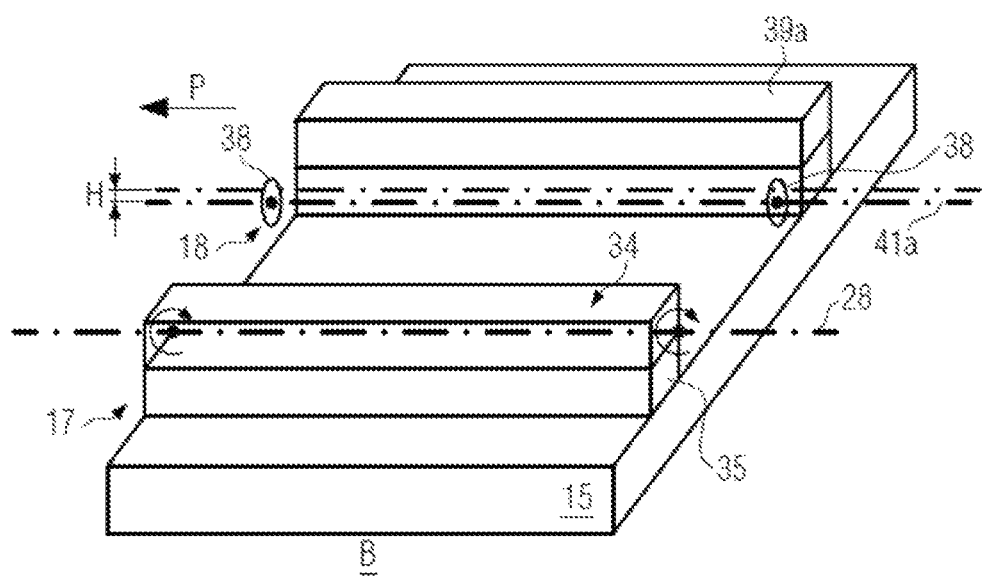
FIG. 7 is a schematic representation of one embodiment of a lifting rail arrangement of a tilting mechanism in accordance with the teachings of the present disclosure.

The tilting part 27 is connected to one end of a lifting rail 34 which extends into the image plane of FIG. 6A (see also FIG. 7). The lifting rail 34 is seated on an exchangeable support 35. The support 35 has a slope 36 so that the lifting rail 34 may be pivoted inwards. Finally, FIG. 6A shows a support edge 37 embodied at the tilting part 27. The support edge 37 may, as will be described below in connection with FIG. 6C, rest on the base 15 when the tilting mechanism 16 has transferred the lower tool part 8 positioned thereon to the tilted position K.

According to FIG. 6A, the pivot unit 18 has a pivot bearing 39 embodied with an oblong hole 38. The pivot bearing 39 comprises a lifting rail 39a. In the oblong hole 38 of the pivot bearing 39, a pivot projection 40 is received which is embodied, for example, as a pivot pin 41. The pivot pin 41 is fastened, according to FIG. 6A, to a bottom part 42 of the base plate 19. The pivot pin 41 defines a pivot axis 41a (see FIGS. 6B, 6C and 7).

According to FIG. 6A, the tilting mechanism 16 is adjusted in a first position S1 in which the lower tool part 8 is oriented horizontally for a production operation. With reference to the following FIGS. 6B and 6C, it will be described how the tilting mechanism 16 may be moved from the first position S1 to a second position S2 shown in FIG. 6C.

Figure 6B:
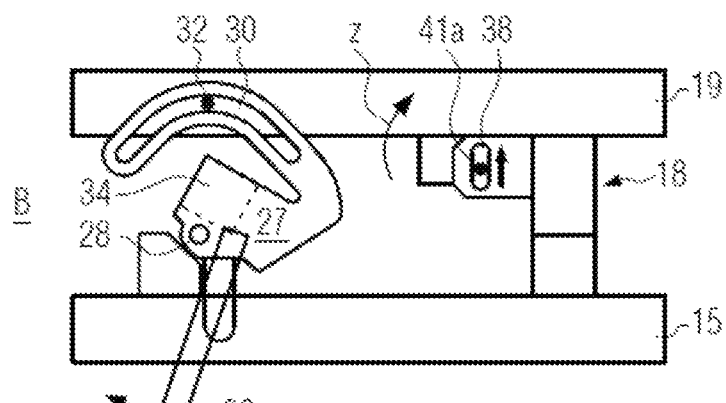
FIG. 6B is a schematic view of the lifting gear apparatus of FIG. 6A showing the tilting mechanism when it is leaving its locked position.

FIG. 6B shows that the grip 32 is moved towards the operator's side B clockwise. In the process, the tilting part 27 including the lifting rail 34 fixed thereto also pivots clockwise about the tilting axis 28. The stud 32 is thereby shifted within the guide 30 from the right to the left, whereby the base plate 19 is initially slightly lifted on the side of the pivot unit 18. Arrow Z indicates this. This slight lifting of the base plate 19 is due to the geometry and the position of the guide 30, and may be compensated by the oblong hole 38 by the pivot pin 41 received thereon being slightly lifted upwards. If the tilting movement is continued, by the inward tilting of the tilting part 27, the base plate 19 starts to lower down to the operator's side B. In the process, the base plate 19 pivots counter-clockwise about the pivot axis 41a through which the pivot pin 41 extends.

In FIG. 6C, the base plate 19 is transferred to the oblique position shown in FIG. 4 in which the lower tool part 8 is brought to the tilted position K. The tilting mechanism 16 is positioned in the second position S2. In the second position S2, the stud 32 is transferred to an end 30a of the guide 30 facing the operator's side B. Furthermore, FIG. 6C shows that in the second position S2 of the tilting mechanism 16, the support edge 37 of the tilting part 27 rests on a surface 43 of the base 15. Furthermore, the tilting part 27 transfers the lifting rail 34 fixed thereto inwards in such a way that it forms a support surface 44 for a bottom 45 of the base plate 19. Thus, the base plate 19 and the lower tool part 8 arranged thereon are stably held in the second position S2 so that the lower tool part 8 not shown in FIGS. 6A to 6C is stably oriented for a tool changing operation.

The tilting mechanism 16 shown in FIGS. 6A to 6C may analogously also be embodied on an opposite side of the base plate 19 projecting into the image plane. Thereby, the operator could operate the tilting mechanism 16 with both hands.

FIG. 7 schematically shows the base 15 of the lifting gear 7, at least partially the tilting unit 17 arranged thereon, and the pivot unit 18 opposite the tilting unit 17 in a perspective representation. FIG. 7 shows that the lifting rail 34 may be pivoted about the tilting axis 28 into the image plane of FIG. 7. Thereby, the base plate 19 not shown in FIG. 7 is slightly lifted, at the beginning of the pivoting movement, according to a height H, which, however, may be compensated by the oblong hole 38 at the pivot unit 18. By the further tilting of the lifting rail 34, which is done, as viewed in the production direction P, clockwise about the tilting axis 28, the base plate 19 not shown on the lifting rail 34 in FIG. 7 is lowered down to the operator's side B, whereby the lower tool part 8 positioned thereon is transferred to the tilted position K shown in FIG. 4.

The tilting mechanism described with reference to the present invention permits the use of a lifting gear 7 with a small stroke length so that the manufacturing costs of the packaging machine 1 may be reduced. In particular in the first position S1, the tilting mechanism 16 may absorb high closing forces during the production operation. Closing forces of up to 100,000 Newton are possible. Nevertheless, the tilting mechanism 16 according to the invention may be operated manually so that the tilting mechanism 16 altogether may be embodied very simply and inexpensively. All functions and design characteristics of the invention according to the described FIGS. 2 to 7, in particular the lifting gear 7 and the tilting mechanism 16, may also be employed at the sealing station 4 and/or the cutting station 5 of the packaging machine 1.

It is finally conceivable to design the tilting mechanism 16 such that it lifts the lower tool part 8 in the tilted position K towards the operator's side B or to a side opposite the operator's side B so that the lower tool part 8 may be pulled out above the machine frame 2 at the packaging machine 1.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine for manufacturing products along a production direction, the packaging machine comprising:
   a machine frame;
   at least one workstation having an upper tool part and a lower tool part;
   a lifting gear for supporting and moving the lower tool part between an open and a closed position in relation to the upper tool part, wherein the lower tool part is immediately adjacent to the upper tool part in the closed position, and is spaced apart from the upper tool part in the open position; and a tilting mechanism for bringing the lower tool part from an operating position in the open position to a tilted position to allow for a tool changing operation and wherein the tilting mechanism brings the lower tool part into the tilted position within the extents of the machine frame.

2. The packaging machine according to claim 1, wherein the tilting mechanism is integrally formed in the lifting gear of the workstation.

3. The packaging machine according to claim 1, wherein in the tilted position, a side of the lower tool part disposed closest to a side frame of the machine frame takes a lower level than an opposite side of the lower tool disposed further away from the side frame.

4. The packaging machine according to claim 1, wherein the tilting mechanism may be adjusted between a first and a second position wherein in the first position of the tilting mechanism, the lower tool part is in the operation position and horizontally oriented for a production operation, and wherein in the second position of the tilting mechanism, the lower tool part is disposed in the tilted position from the horizontal orientation about a tilting angle inclined to a side of the machine frame to allow for the tool changing operation.

5. The packaging machine according to claim 1, wherein the tilting mechanism comprises a tilting unit with a lifting rail, the lifting rail being pivoted about a tilting axis extending in the production direction.

6. The packaging machine according to claim 1, wherein the tilting mechanism comprises a pivot unit with a lifting rail, the pivot unit being a pivot bearing, wherein the pivot bearing being t bearing defines a pivot axis extending along the production direction about which the lower tool part may be pivoted to the tilted position.

7. The packaging machine according to claim 1, wherein the tilting mechanism comprises a base plate releasably coupled to the lower tool part, the base plate is disposed to be pivoted using the tilting mechanism.

8. The packaging machine according to claim 1, wherein the tilting mechanism comprises at least one sensor for detecting a stop position taken by the lower tool part at the tilting mechanism.

9. The packaging machine according to claim 1, wherein the tilting mechanism comprises at least one sensor for detecting a locked position of the tilting mechanism, wherein the lower tool part is horizontally oriented in the locked position.

10. The packaging machine according to claim 1, wherein the tilting mechanism is height adjustable to accommodate one or more lower tool parts having different heights.

11. The packaging machine according to claim 1, wherein the machine frame comprises a seat for removably fastening a rail device to the seat for the tool changing operation, the rail disposed relative to the tilting mechanism to allow an operator to pull the lower tool part out of the machine frame on the rail.

12. The packaging machine according to claim 1, wherein the tilting mechanism is operated from an operator's side of the packaging machine to tilt the lower tool part on the operator's side such that a side of the lower tool part closest to the operator's side is moved downward.

13. The packaging machine according to claim 1, wherein the packaging machine is a deep-drawing packaging machine having at least one of a sealing station and a shaping station.

14. A packaging machine for manufacturing products along a production direction, the packaging machine comprising:

a machine frame;

at least one workstation having an upper tool part and a lower tool part;

a lifting gear for supporting and moving the lower tool part between an open and a closed position in relation to the upper tool part, wherein the lower tool part is immediately adjacent to the upper tool part in the closed position, and is spaced apart from the upper tool part in the open position; and a tilting mechanism for bringing the lower tool part from an operating position in the open position to a tilted position to allow for a tool changing operation; and wherein the tilting mechanism may be adjusted between a first and a second position wherein in the first position of the tilting mechanism, the lower tool part is in the operation position and horizontally oriented for a production operation, and wherein in the second position of the tilting mechanism, the lower tool part is disposed in the tilted position from the horizontal orientation about a tilting angle inclined to a side of the machine frame to allow for the tool changing operation.

* * * * *